INVENTORS: *A. A. BALLMAN*
*J. R. CARRUTHERS*

3,647,697
GROWTH OF CRACK-FREE BARIUM SODIUM NIOBATE AND RELATED MATERIALS

Albert A. Ballman, Woodbridge, and John R. Carruthers, Murray Hill, N.J., assignors to Bell Telephone Laboratories, Incorporated, Murray Hill and Berkeley Heights, N.J.
Filed May 26, 1969, Ser. No. 827,702
Int. Cl. C04b *35/60;* B01j *17/18*
U.S. Cl. 252—62.9                             8 Claims

ABSTRACT OF THE DISCLOSURE

A commercial technique for growth of optical grade material of the nominal composition $Ba_2NaNb_5O_{15}$ is described. The usually encountered cracking problem is minimized by following a critically slow cooling rate over a short temperature interval of from about 600° C. to about 400° C. Initial cooling from the crystallizing temperature to this interval and from this range to room temperature is not critical and may be rapid.

BACKGROUND OF THE INVENTION

(1) Field of the invention

The invention is concerned with a commercially expedient procedure for the growth of optical grade material of the nominal composition $Ba_2NaNb_5O_{15}$. This material is considered by most workers to be the most promising for frequency conversion of laser emanations (e.g. second harbonic generation and parametric oscillation).

(2) Description of the prior art

A class of nonlinear optical materials is described in vol. 11, No. 9, Applied Physics Letters, p. 269 (1967). One of these materials of the nominal composition,

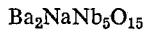

nicknamed "Bananas," is of considerable interest for the frequency conversion of coherent light. Figures of merit for second harmonic generation or parametric conversion are comparable to or better than those of the best previous material, $LiNbO_3$. Whereas the previous material "damages" in use, i.e. develops local inhomogeneities which make it unsuitable for further optical use, the new material is not subject to such deterioration.

Samples of $Ba_2NaNb_5O_{15}$ have shown such a high degree of optical perfection that insertion in an infrared laser cavity has produced harmonic generation with no detectable insertion loss. The same composition resulted in the first reported CW parametric oscillator.

By reason of the widespread interest in this new nonlinear material, a number of companies have become interested in its production. Crystals of this material are now available from several commercial sources.

Efficient growth of optical grade material has been thwarted by a cracking problem. The material is expediently grown from the melt by crystal pulling at growth rates of the order of ½ inch per hour or higher; and, under these circumstances, crystals are sufficiently cracked that only small selected samples may be usefully incorporated in optical devices.

Cracking, although particularly pronounced in the growth of $Ba_2NaNb_5O_{15}$, is not an unusual problem. It is ordinarily due to thermal changes in dimension during cooling and the common approach to its elimination involves slow cooling. This approach has been of limited success in the growth of this new nonlinear material. Relatively crack-free specimens have been produced in massive resistance-heated apparatus with provision for very slow cooling from the crystallizing temperature of above 1400° C. to temperatures near room temperature. This cooling schedule imposes a significant limitation on production rates. Use of such massive equipment imposes an additional limit on growth rate because of the inherently low temperature gradients.

SUMMARY OF THE INVENTION

Careful study of $Ba_2NaNb_5O_{15}$ and certain related systems reveals the unusual fact that dimensional dependence on temperature is minimal from the crystallizing temperature down to about 600° C. These studies reveal that such dependence is of significant magnitude only over the range of from about 600° C. to about 400° C. Accordingly, growth procedures for optical grade material of the noted class may involve rapid cooling from the crystallization temperature to about 600° C. So long as a critically slow rate is followed from about 600° C. to about 400° C., high grade optical crystals showing only minimal cracking or no cracking whatever may be produced. This, in turn, eliminates the need for high thermal mass growth equipment. R.f. induction, low-mass resistance, or other similar equipment permits efficient heat dissipation and, therefore, faster growth rate.

The invention is described in terms of the melt growth of materials of the nominal composition, $Ba_2NaNb_5O_{15}$, as well as related materials, for example, those including strontium as an additional ingredient, in which cooling from the crystallization temperature is carried out at two distinct rates corresponding to two distinct temperature intervals. These rates, which are dependent upon the size of the growing crystal, are defined in terms of a relatively rapid rate expressed as a minimum value over the first interval down to about 600° C., followed by a slow rate defined in terms of a maximum permitted value down to about 400° C. Cooling rate is again not critical thereafter and the growing crystal may simply be removed from the furnace and permitted to cool to room temperature without control.

In accordance with a preferred species of the inventive method, cognizance is taken of the fact that a particular narrow range of compositions deviating slightly from the nominal formula set forth above is congruently melting. Crystals of this particular compositional range show not only improvement in crack reduction common to the class of materials grown by the method herein but are also preferred in that striations are minimized. Such striations have been associated with small compositional changes resulting from thermal fluctuations at the liquid-solid interface during growth. This type of flawing, again, imposes a limit on growth rate. Use of the congruently melting composition lessens this problem.

The inventive cooling schedule may be carried out in different ways. One approach, which resulted in some of the experimental data reported herein, involves melt growth in, for example, R.F. equipment with uncontrolled (rapid cooling) to a temperature of 600° C. The grown crystal is thereafter moved into a controlled zone or other apparatus performing the same function within which cooling to 400° C. is carried out at or below a critical rate. A second approach, particularly useful where large melts are used or where the composition is near-congruently melting, involves continuous cooling through an uncontrolled region above the surface and thence directly through a controlled zone maintained at such temperature that cooling occurs over the prescribed interval at an appropriate rate due to the particular growth rate. Due to the relatively short interval over which cooling must be controlled, apparatus dimensions are manageable for presently used as well as for forseeable growth rates.

The major dimensional change over the described interval is along the *c*-axis. Accordingly, permitted cooling rates are at a maximum for c-axis growth. Permitted cooling rates over the same interval are at a minimum for a-axis (or b-axis) growth; and to a first approximation, permitted rates for off-axis growth are linearly related to the angle of growth for intermediate directions.

BRIEF DESCRIPTION OF THE DRAWING

FIG. 2b, on coordinates of distance in inches, and temperature in degrees centigrade, illustrates a typical temperature profile for apparatus such as that of FIG. 2a.

DETAILED DESCRIPTION (1) Drawing

Referring again to FIG. 1, ordinate units are expressed as 1,000 times the fractional change in dimension. The data presented are typical for barium sodium niobate compositions of $Ba_2NaNb_5O_{15}$ and related materials as discussed. The data was measured on an automatic recording dilatometer. Heating and cooling curves were essentially identical and were measured for each of the three axial directions of this orthorhombic crystal. The significant features are the large contraction of the c-axis initiated at about 600° C. and the anisotropy of the dimensional changes along this axis. The a and b-axis curves are more nearly isotropic and are considered to illustrate more usual expansion behavior.

Figure 1:
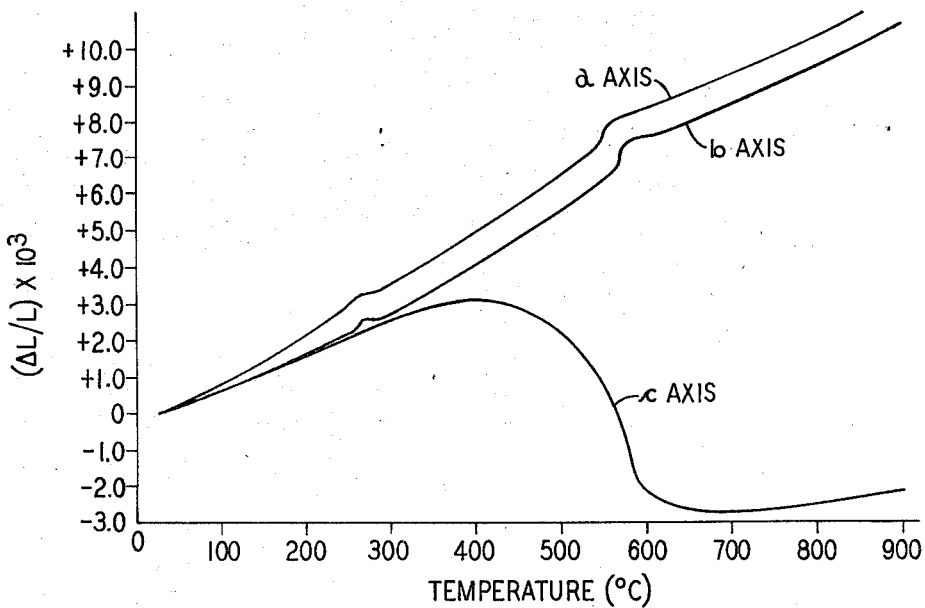
FIG. 1, on coordinates of change and dimension and temperature, is a plot showing the relationship between those two parameters for the three principle axial directions.

It is the development of the data represented by that of FIG. 1 which resulted in the inventive process but even this data represents an ideal situation. Temperature gradients within the crystal during cooling may result in the imposition of large strains in relatively small regions. Also, while the temperature interval of significance is substantially independent of compositional variations within the materials of concern, small compositional variations within the crystal do result in a shift in the curve within the interval and may, therefore, cause a disproportionate increase in local strain. Furthermore, there may be internally misoriented regions in the crystals due to high temperature deformation during growth. These cause internal stress concentrations because of the anisotropy of the transformation strains which enhance the susceptibility to cracking.

Cracking is further enhanced for crystal growth in directions other than along the c-axis since the critically resolved shear stress is thereby increased. Another complication arises from surface imperfections such as notches which provide sources of stress concentration and may serve as crack nucleation sites.

Referring again to FIG. 2a, the apparatus depicted includes a platinum crucible 1 surrounded by induction coil 2 which is supplied with R.F. by means not shown. Coil 2 is imbedded in a mass of insulating material which may be granular alundium. As depicted, a growing crystal 4 is being withdrawn on sapphire rod 5 from melt 6. An after heater or a cooling furnace 7 which may consist of a resistance winding energized by leads 8 and 9 connected to means not shown is vertically displaced from the growth region. The entire apparatus is contained within a suitable receptacle 10 which may be constructed of alundum.

Figure 2A:
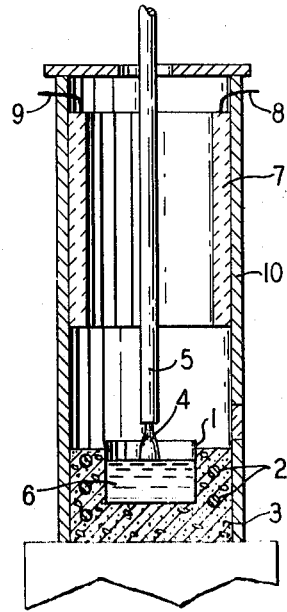
FIG. 2a is a cross-sectional view of suitable growth apparatus suitable for the practice of the invention.
Figure 2B:
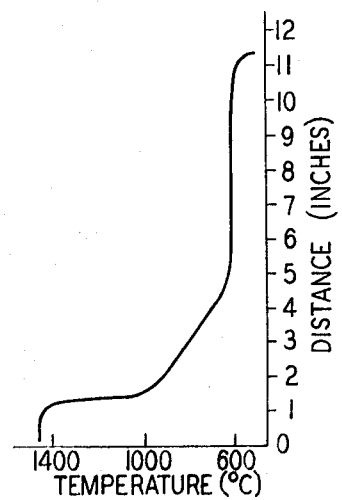

The plot of FIG. 2b shows an actual temperature profile for a specific piece of apparatus of the design of FIG. 2a. In the actual apparatus, the melt which had a depth of about 1 inch, was maintained close to the growth temperature somewhat in excess of 1400° C. Due to the typically low thermal mass of the R.F. heating equipment and associated structural members, the temperature within a small fraction of an inch above the interface drops 400°. Cooling furnace 7 was maintained at a temperature of about 600° C. so that cooling of the grown crystal to a temperature below that value was not permitted prior to entrance of the crystal into the cooling furnace.

Equipment typified by that of FIG. 2a may be operated in two ways. With a relatively small melt, and particularly for compositions which are not congruently melting, the vertical dimension of crystallizing material is such that the cooling furnace position is not attained. The crystal, therefore, does not reach a temperature below 600° during growth. In accordance with this mode, the crystal is positioned in the center of the cooling furnace after termination of growth; and the furnace temperature is decreased at a suitable programmed rate until a temperature of 400° C. is achieved. For the design shown with relatively large apertures at the entrance and exit of the cooling furnace, it is desirable to utilize a cooling furnace of length somewhat greater than that of the crystal since the profile within the cooling furnace is not flat. In actual experiment, it was found desirable to maintain a temperature differential of less than 0.5° C. per centimeter of crystal length.

A second mode of operation, suitable for use with relatively large melts and particularly for congruently melting compositions, calls for continuous passage of the crystallizing matter through the cooling furnace. Furnace dimensions and growth rates are adjusted so as to maintain the critical cooling rate over the interval at or below the maximum noted.

(2) Critical cooling rates

Under usual conditions, desired cooling rates vary inversely as the radius squared. Cooling rates discussed in this section, unless otherwise noted, are based on a radius of one centimeter. Such normalized cooling rates are, therefore, to be adjusted to the particular thickness of the growing crystal by the square of the inverse radius ratio.

It has been noted that the cooling rate from the crystallization temperature to about 600° C. is noncritical. In fact, this cooling rate may be ignored at any present or contemplated growth rate in any suitable apparatus. The only significant limitation is that the crystal not be permitted to obtain a temperature as low as 600° C. over this initial interval. It has been estimated that cooling rates as high as 1500° C. per hour over this first interval are tolerable.

Since a large part of the significance of the invention is in the permissibility of such large cooling rates over this first interval, it is desirable to designate a minimum limit. For many purposes, this limit may be set at about 200° C. per hour for a crystal radius of 1 cm. or more generally at about 200° $C./R^2$ where R is the crystal radius. It should be understood, however, that this rate is based largely on expediency and that the reason for its being is primarily economic. Slower rates are, of course, not harmful to optical quality but are merely uneconomical, and for this reason are unacceptable for the inventive processes.

The cooling rate over the second interval, that is from about 600° C. to about 400° C., is normalized at a maximum rate of about 150° C. per hour. As noted, this is for a one-centimeter radius crystal and may be adjusted to suit other crystal thicknesses by the square of the inverse radius ratio. Accordingly, the equivalent rate for a crystal of half this radius is 600° C. per hour. This maximum permitted rate over the critical interval is for c-axis growth. An equivalent value for an a-axis or b-axis growth on the normalized basis is about 15° C. per hour and values for off-axis growth are approximately linearly dependent on angular displacement, of the growth axis e.g. the normalized value for growth 45° to the c-axis is about 85° C. per hour and for 22½° to the c-axis and 22½° to the a-axis are about 115° C. per hour and 50° C. per hour respectively.

The above maximum tolerable cooling rates may result in some cracking but the uncracked regions are sufficiently large to permit practical device fabrication. Complete avoidance of cracks requires a normalized cooling rate for c-axis growth of about 30° C. per hour and for a-axis or b-axis growth about 5° C. per hour. Off-axis growth preferred maxima are, again, linearly dependent upon displacement angle.

It is known that good optical quality is more easily obtained with off-axis growth. This is based on the introduction of striations due to compositional inhomogeneities probably accompanying temperature fluctuations at the growth interface. It has been noted that a congruently melting composition has been determined for the barium sodium niobate system. Growth of this composition reduces striations to a minimum; and it is, therefore, a preferred composition for the purposes of this invention. Its use may permit c-axis growth with minimization of striations which, by reason of the larger permitted cooling rate maxima set forth above, is economically advantageous. The congruently melting composition is more conveniently designated in terms of the oxidic constituents $Nb_2O_5:Na_2O:BaO$ which is approximately 0.49:0.08:0.43. This corresponds to the approximate formula

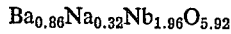
$Ba_{0.86}Na_{0.32}Nb_{1.96}O_{5.92}$

While the above is a preferred composition in the practice of this invention, other compositions approximating that of the nominal formula are advantageously grown utilizing the cooling schedule set forth. The approximate range of included compositions deviate from the nominal formula by no more than about ±20% of each ionic constituent. It is convenient to express the designated system in terms of the nominal formula "together with associated solid solution." Such language designates that portion of the ternary phase equilibrium diagram evidencing the substantially tetragonal tungsten bronze structure. A modification of the nominal composition considered to be of some device interest contains up to ten atom percent strontium substituted for barium. This substituted composition evidences similar dilatometric thermal behavior and is advantageously processed in the same manner and within the same parameter limits discussed.

Cooling rates from 400° C. to room temperature are noncritical. In practice, it is convenient to simply turn off the furnace or to remove the specimen once that temperature has been achieved. Normalized rates of the order of 1000° C. per hour and higher are tolerable. Since higher cooling rates are achieved only with deliberate quenching in cooling fluids, this portion of the cooling cycle may, under ordinary circumstances, suit the convenience of the practitioner.

An important aspect of the invention results from apparatus design considerations. Since large thermal mass is no longer required (so that use may be of R.F. induction heaters, low mass resistance elements, etc.), higher growth rates become practical. Particularly where use is made of congruently melting compositions, growth rates well in excess of presently used rates of about ⅛ inch per hour are contemplated.

What is claimed is:
1. Method for the melt growth of single crystal material of the nominal composition $Ba_2NaNb_5O_{15}$ in which barium may be replaced by up to ten atom percent strontium and in which a particular ion content may vary by a maximum amount of up to 20 atom percent in the compositional range where the tetragonal tungsten bronze structure is retained, characterized in that cooling of the crystallizing material is carried out at a minimum rate of $200°/R^2$ C. per hour over a first temperature interval from the crystallizing temperature down to about 600° C., and, thereafter, at a maximum rate of about $150/R^{2°}$ C. per hour over a second temperature interval of from about 600° C. to about 400° C. where R is the radius of the growing crystal in centimeters.

2. Method of claim 1 in which growth is carried out by crystal pulling with growth initiating on a seed of the said composition.

3. Method of claim 2 in which the c-crystallographic axis of the said seed is substantially aligned with the growth direction.

4. Method of claim 1 in which the cooling rate over the said second temperature interval is a maximum of about $30/R^{2°}$ C. per hour.

5. Method of claim 1 in which the maximum cooling rate over the said second interval is from $150/R^{2°}$ C. per hour to about $15/R^{2°}$ C. per hour with the said values corresponding in that order to growth in the c-direction and growth orthogonal to the c-direction, and in which the maximum cooling rate over the said second interval varies linearly with angle for intermediate directions of growth.

6. Method of claim 5 in which the maximum cooling rate over the said second interval is from $30/R^{2°}$ C. per hour to about $5/R^{2°}$ C. per hour.

7. Method of claim 1 in which the said single crystal material is maintained within a temperature range down to 600° C. during growth and in which the said material is cooled over the said second temperature interval subsequent to growth.

8. Method of claim 1 in which cooling over both of the said temperature intervals takes place, at least in part, during growth.

References Cited
UNITED STATES PATENTS
3,423,686   1/1969   Ballman et al. ____ 252—62.9 X

OTHER REFERENCES
Geusic et al. "Applied Physics Letters," vol. 11, No. 9, Nov. 1, 1967.

HELEN M. McCARTHY, Primary Examiner

J. COOPER, Assistant Examiner

U.S. Cl. X.R.

23—301, 302, 304; 106—42